US012555238B1

(12) United States Patent
Huang et al.

(10) Patent No.: US 12,555,238 B1
(45) Date of Patent: Feb. 17, 2026

(54) METHOD, SYSTEM, AND APPARATUS FOR EFFICIENT TOTAL BODY PHOTOGRAPHY IMAGE PROCESSING

(71) Applicant: LUMO IMAGING LLC, Potomac, MD (US)

(72) Inventors: Wei-Lun Huang, North Potomac, MD (US); Ping-Cheng Ku, Baltimore, MD (US); Davood Tashayyod, Potomac, MD (US)

(73) Assignee: Lumo Imaging LLC, Potomac, MD (US)

( * ) Notice: Subject to any disclaimer, the term of this patent is extended or adjusted under 35 U.S.C. 154(b) by 0 days.

(21) Appl. No.: 19/272,492

(22) Filed: Jul. 17, 2025

(51) Int. Cl.
*G06T 7/00* (2017.01)
*A61B 5/00* (2006.01)
(Continued)

(52) U.S. Cl.
CPC .......... *G06T 7/0016* (2013.01); *A61B 5/0064* (2013.01); *A61B 5/444* (2013.01); *G06T 7/215* (2017.01); *G06V 10/46* (2022.01); *G06V 10/56* (2022.01); *G06V 10/62* (2022.01); *G06V 10/72* (2022.01); *G06V 10/7635* (2022.01);
(Continued)

(58) Field of Classification Search
None
See application file for complete search history.

(56) References Cited

U.S. PATENT DOCUMENTS 11,551,353 B2 * 1/2023 Golden .................... G06N 3/09
2011/0218428 A1 * 9/2011 Westmoreland ......... A61B 6/00
600/425
(Continued)

FOREIGN PATENT DOCUMENTS

CN           114863525 A  *  8/2022  ........... G06V 40/168

OTHER PUBLICATIONS

Korotkov, K., Quintana, J., Campos, R., Jesus-Silva, A., Iglesias, P., Puig, S., Malvehy, J., & Garcia, R. (2019). An Improved Skin Lesion Matching Scheme in Total Body Photography. IEEE Journal of Biomedical and Health Informatics, 23(2), 586-598. https://doi.org/10.1109/JBHI.2018.2855409. (Year: 2019).*
(Continued)

*Primary Examiner* — Amandeep Saini
*Assistant Examiner* — Caroline Tabancay Duffy
(74) *Attorney, Agent, or Firm* — IP Consulting Group; Michael Razavi; Alfred F. Hoyte, Jr.

(57) ABSTRACT

The invention relates to a method and apparatus for high resolution total body photography (TBP). The inventive method uses a multi-stage keypoints focused pipeline that begins with blob detection to rapidly and coarsely localize potential lesions within high-resolution TBP images. Once these regions of interest are identified, a deep learning classifier evaluates them for malignancy risk. Acknowledging that wide-field imaging can compromise classification precision due to variability in resolution and appearance, the process is further refined by integrating ugly duckling analysis and t-SNE clustering. The ugly duckling detection process groups suspicious regions across all images, effectively highlighting clusters of high-risk candidates for further clinical review utilizing the method of the invention.

22 Claims, 6 Drawing Sheets

(51) Int. Cl.
  *G06T 7/215* (2017.01)
  *G06V 10/46* (2022.01)
  *G06V 10/56* (2022.01)
  *G06V 10/62* (2022.01)
  *G06V 10/72* (2022.01)
  *G06V 10/762* (2022.01)
  *G06V 10/77* (2022.01)
  *G06V 10/776* (2022.01)
  *G06V 20/64* (2022.01)

(52) U.S. Cl.
  CPC ........ *G06V 10/7715* (2022.01); *G06V 10/776* (2022.01); *G06V 20/653* (2022.01); *G06T 2207/10024* (2013.01); *G06T 2207/30096* (2013.01)

(56) References Cited

U.S. PATENT DOCUMENTS

| | | | | |
|---|---|---|---|---|
| 2015/0003698 A1* | 1/2015 | Davis | ............... | G10L 19/018 382/128 |
| 2018/0218496 A1* | 8/2018 | Sinai | ............... | G06T 7/0012 |
| 2021/0104043 A1* | 4/2021 | Crawford | ............... | G06T 7/0014 |

OTHER PUBLICATIONS

Cao, C.-H., Tang, Y.-N., Zhou, H., Li, Y.-L., & Marszalek, Z. (2023). DBSCAN-Based Automatic De-Duplication for Software Quality Inspection Data. IEEE Access, 11, 17882-17890. https://doi.org/10.1109/ACCESS.2022.3164192. (Year: 2023).*

Zhao, M., Kawahara, J., Abhishek, K., Shamanian, S., & Hamarneh, G. (2022). Skin3D: Detection and longitudinal tracking of pigmented skin lesions in 3D total-body textured meshes. Medical Image Analysis, 77, Article 102329. https://doi.org/10.1016/j.media.2021.102329. (Year: 2022).*

Naranpanawa, N., Soyer, H. P., Mothershaw, A., Kulatilleke, G. K., Ge, Z., Betz-Stablein, B., & Chandra, S. S. (2024). Ugly Ducklings or Swans A Tiered Quadruplet Network with Patient-Specific Mining and Dynamic Margin for Improved Skin Lesion Classification. arXiv: 2309.09689v1 [cs.CV] Sep. 18, 2023. (Year: 2023).*

Cao, C.-H., Tang, Y.-N., Zhou, H., Li, Y.-L., & Marszalek, Z. (2023). DBSCAN-Based Automatic De-Duplication for Software Quality Inspection Data. IEEE Access, 11, 17882-17890. https://doi.org/10.1109/ACCESS.2022.3164192 (Year: 2022).*

* cited by examiner

METHOD, SYSTEM, AND APPARATUS FOR EFFICIENT TOTAL BODY PHOTOGRAPHY IMAGE PROCESSING

FIELD OF THE INVENTION

The invention relates generally to imaging devices. More specifically, the invention relates to a method and apparatus for high resolution total body photography.

BACKGROUND OF THE INVENTION

The next generation of Total Body Photography (TBP) systems are being designed to resolve structures that are smaller than 30 microns. This translates to approximately 20 GB or more of data per TBP scan. The TBP images have to be processed to create photogrammetry-based 3D reconstruction, to extract the lesions from background skin, and to find the lesions from a previous scan that correspond to the lesions from the latest scan. Processing this amount of data can be computationally expensive.

Early-stage skin cancers often lack obvious clinical signs and may resemble benign atypical nevi. Accurate identification requires monitoring of subtle changes in color, size, texture, and border irregularity. Traditionally, such longitudinal tracking was labor-intensive and limited to high-risk patients. Our proposed system combines ultra-high-resolution full-body imaging with automated lesion tracking, offering scalable, cost-effective monitoring for the broader at-risk population-estimated at over 60 million individuals in the U.S.

Precise tracking of location, dimension, and features of the skin cancer pigmentations over time is important. However, precise mapping may be complicated by the fact that participants may go through physical changes and their pose may vary during the data capture (including the subject's movements during the scan) or in between TBP sessions.

Many kinds of image processing that are applied to TBP images rely on finding keypoints. In computer vision (image processing), keypoints are distinctive points in an image used to identify, describe, or match objects or features. Here, we distinguish two classes of keypoints: (1) Coarse keypoints ("blobs"): connected regions or spots ($\geq 1$ mm in diameter) that localize larger pigmented areas. (2) Fine keypoints: sparse, highly repeatable micro-features (corners, texture points, tiny border irregularities) that capture lesion cues smaller than blobs.

There are versions of algorithms that use keypoints for 3D rendering, lesion identification and lesion correspondence. The general-purpose Keypoints detection algorithms utilized by these algorithms are not optimized for dermatology. Moreover, there is no need for the 3D rendering, lesion identification and lesion correspondence algorithms to extract the Keypoints multiple times.

The optimal algorithm for keypoints yields the minimum number of keypoints yet can ensure with high confidence that no pigmented lesions are missed and that the 3D rendering and lesion correspondence algorithm do not fail due to not having enough keypoints. Finding the Optimal keypoints reduces the image processing time because it circumvents the repeated detection of keypoints and because the downstream algorithms will base their computation on a much smaller set of keypoints. The optimization of keypoint selections also improves the performance of the downstream algorithms such as 3D rendering, lesion detection, and lesion correspondence tasks due to the tailoring of the Optimal Keypoints to those tasks.

A method for finding suspicious lesions can rely on landmark-based 3D registration to identify corresponding lesions across serial TBP scans and assess changes over time. It performs two key tasks: (1) automatically matching lesions between visits, and (2) using AI to evaluate whether detected changes are clinically significant. This automation reduces the need for manual image review and annotation by dermatologists, directly addressing workflow inefficiencies. Comparative study of the evolution for all the skin lesions across a patient's body may reveal one or more lesions with transformations that are unlike the rest of the lesions' transformations (i.e. exhibiting a more rapid change in color, texture size, etc.); such lesions have been termed "Dynamic Ugly Ducklings", as opposed to "Ugly Duckling" which is the one lesion that looks different than the rest of the lesions on the body.

One of the primary challenges in developing effective CNN-based melanoma detection systems is the processing of high-resolution, wide-field skin images. These images often contain numerous skin lesions and other features, necessitating efficient algorithms to isolate potential regions of interest (ROIs) for further analysis. Several approaches have been proposed to address this issue, including patch-based methods, sliding window techniques, and fully convolutional networks, which can process images of varying sizes and scales.

However, the majority of these deep learning models have been trained predominantly on close-up dermoscopic images that provide detailed views of individual lesions. While this approach has shown great promise in detecting melanoma at a fine level, it does not fully address the challenges posed by wide-field 2D images used in TBP. In TBP, images capture large portions of the skin surface at lower resolutions, where individual lesions may be less prominent or harder to distinguish due to lighting variations, differing capture angles, or partial occlusions. As a result, applying conventional dermoscopic-trained models to TBP images may not yield optimal results, as the models are not designed to handle the inherent variability in scale and appearance that arises in full-body photographs.

Moreover, TBP presents a different set of challenges for lesion detection. Unlike dermoscopic images, which are highly detailed and centered on a single lesion, TBP images contain multiple nevi or other skin features across a broader surface area. While some research has been performed by utilizing TBP for longitudinal change detection and potential lesion detection with simple image processing techniques, applying deep learning directly for initial risk assessment on standard 2D TBP images remains complex. Given the lower effective resolution of individual lesion image and the greater diversity of skin textures and lesion types in standard 2D TBP images, the performance of existing networks, often trained on high-detail dermoscopic images, may degrade when applied directly for initial lesion assessment, potentially leading to missed melanomas or increased false positives.

Despite advancements in imaging, the vast number of TBP images remains a significant challenge. Dermatologists are often overwhelmed by the sheer volume of wide-field photographs, which makes it impractical to manually scrutinize every skin region and increases the risk of missing subtle yet critical lesions during routine assessments.

SUMMARY OF THE INVENTION

To specifically address these challenges of efficiently analyzing numerous lesions within wide-field 2D TBP images and identifying potentially malignant outliers, the present invention disclosure presents a multi-stage keypoints focused pipeline that begins with blob detection to rapidly and coarsely localize potential lesions within high-resolution TBP images. Once these regions of interest are identified, a deep learning classifier evaluates them for malignancy risk. Acknowledging that wide-field imaging can compromise classification precision due to variability in resolution and appearance, the process is further refined by integrating ugly duckling analysis and t-SNE clustering. The ugly duckling detection process groups suspicious regions across all images, effectively highlighting clusters of high-risk candidates for further clinical review utilizing the following steps.

Correspondence Tracking: A method wherein the same lesion (corresponding lesions) from two sequential scans is marked using landmark-based registration to track and match lesions over time. In one embodiment learning-based keypoint detection (e.g. Superpoint [DeTone et al., 2018]) and keypoint matching (e.g. LightGlue [Lindenberger et al., 2023]) provides sparse but accurate correspondence pairs from the 2D TBP images, followed by template matching for better localization accuracy of lesions in correspondence In another embodiment using 3D textured mesh, we start by computing correspondence maps bringing the source and target meshes to a template mesh. Using these maps to define source/target signals over the template domain, we construct a flow field aligning the mapped signals. The initial correspondence maps are then refined by advecting forward/backward along the flow field. Finally, lesion assignment is performed using the refined correspondence maps.

Lesion Aligning: A method wherein images from two different instances (two timepoints) of the same lesions will have to be aligned before further analysis. In one embodiment, keypoints are found in both source and target image of a single lesion. By finding the correspondences between the source and target, the images will be aligned.

Lesion Documenting: Traditional feature analysis or an AI (artificial intelligence software) that will be trained with images and descriptions of the lesions. The trained model will be able to write a description for the lesion (essentially writing the clinician's notes for every lesion on the body). In the case of the AI, a feedback loop can allow the AI to learn from any corrections that the clinician makes to the notes.

Dynamic Ugly Duckling Detecting: An analysis software (e.g. regression analysis based on feature detection) or an AI will be given all the notes that are generated by the lesion documenter as well as other information (e.g., age) in order for the system to list all the lesions with transformation ordered based on the rate of transformation.

BRIEF DESCRIPTION OF THE DRAWINGS

FIGS. 3 (a) and (b) illustrate a process of matching lesions using both 2D images and 3D meshes of total body photography.

FIG. 4 (a)-(c) show a process for matching lesions using 3D textured mesh.

DETAILED DESCRIPTION OF THE INVENTION

Figure 1:
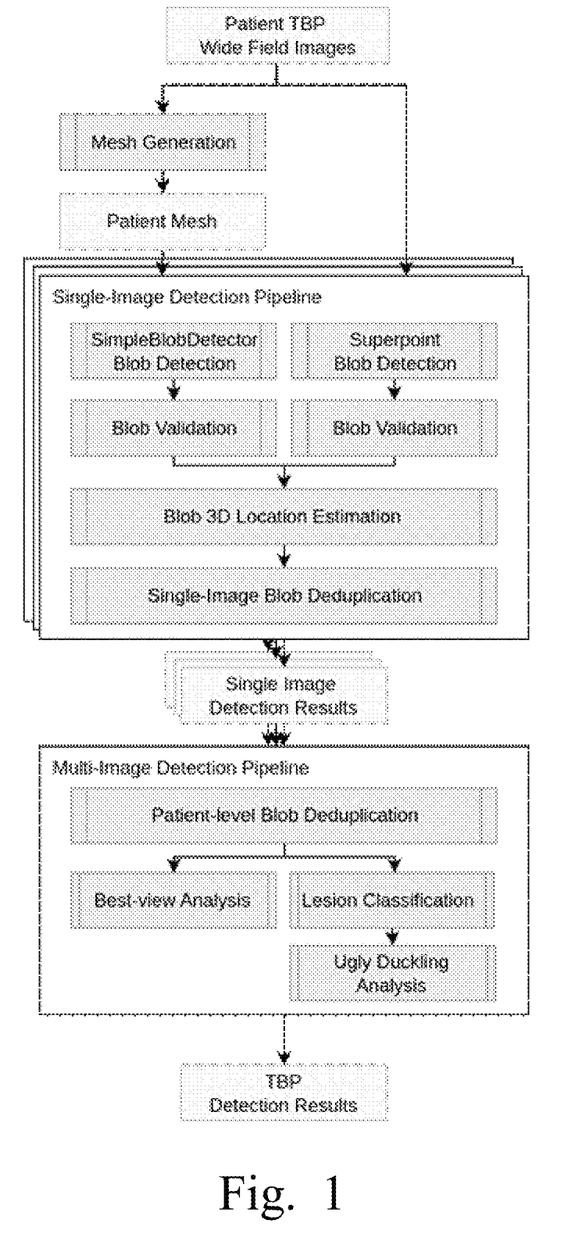
FIG. 1 shows a flowchart depicting a multi-stage pipeline to detect and classify the pigmented lesions and identify the ugly ducklings among the unique lesions from the patient.

A high-speed and high-accuracy method and system for implementing a multi-stage pipeline for processing 2D images from a Total Body Photography device in order to reconstruct a 3D representation of the subject, to detect all pigmented lesions in all images, and to find corresponding lesions from an earlier scan to the lesion in a newer scan is provided. The first step is to introduce the lesion detection pipeline for 2D TBP images when a 3D mesh is given and reconstructed from the 2D TBP images. This method utilizes an ensemble of blob and keypoint detection methods tailored for dermatological applications.

Lesion Detection

Lesion Detection aims to detect all the unique pigmented lesions in a scan of TBP images of a patient. During a comprehensive TBP session, a single skin lesion may be visible in several images taken from different angles or in overlapping regions of adjacent images. If each detection event is treated as a unique lesion, the resulting dataset will contain redundant entries, leading to an overestimation of lesion counts and complicating subsequent analyses, particularly longitudinal tracking. Therefore, it is necessary to 1) detect pigmented lesions in individual images with high sensitivity, 2) and determine a set of unique lesions at patient-level.

The following is an embodiment of a lesion detection method where a plurality of 2D TBP images and a 3D mesh are provided, wherein the 3D mesh is reconstructed from the 2D TBP images using photogrammetry-based 3D reconstruction.

Single-Image Detection Pipeline

The pipeline first performs coarse and fine keypoint detection on all images captured from the TBP system. Assume that a total of $N_I$ images were collected, the task for this step is that for each wide-field image $I^{(m)}$ (m=1, ..., $N_I$), it is necessary to detect a set of blobs $\mathcal{B}^{(m)} = \{b^{(m,s)}\}$ from the image. Each keypoint is represented as $b^{(m,s)} = (p^{(m,s)}, d^{(m,s)})$, where $p^{(m,s)} \in \mathbb{R}^2$ is the pixel coordinate of the blob center in $I^{(m)}$, and $d^{(m,s)} \in \mathbb{R}^+$ is the estimated blob diameter in pixels. Each image undergoes two different feature detection algorithms: OpenCV SimpleBlobDetector blob detection method (SBD) and Superpoint blob detection (SP) method. The blobs are further validated and then deduplicated to acquire the final detected blobs for each image.

OpenCV's SimpleBlobDetector detects coarse keypoints ("blobs") in images. It operates by converting the source image into multiple binary images through thresholding, extracting connected components, and filtering them based on criteria such as area, circularity, convexity, and inertia ratio. This method is effective for detecting simple, well-defined blobs but may struggle with more complex structures or detecting small-scale, high-precision keypoints. The blobs detected from this method for $I^{(m)}$ are denoted as $\mathcal{B}_{SBD}^{(m)}$.

SuperPoint is a deep learning-based method for real-time detection of fine keypoints. It utilizes a convolutional neural network to detect keypoints and compute descriptors, offering improved robustness and accuracy over traditional blob detection methods but requires increased computational resources for training and inference. This invention proposes a complementary methodology that combines the strengths of OpenCV's SimpleBlobDetector with SuperPoint. While SimpleBlobDetector excels at identifying large, well-defined blobs, SuperPoint is adept at detecting small-scale features and fine details, which are crucial for high-resolution tasks but are often overlooked by traditional methods due to their reliance on specific blob criteria. The blobs detected from this method for $I^{(m)}$ are denoted as $\tilde{\mathcal{B}}_{SP}^{(m)}$.

Keypoint Validation

The proposed keypoint validation process employs a combination of color profile analysis and histogram comparison to ensure the detected keypoints are valid moles or skin features. This method filters out invalid blobs by examining their color characteristics in the context of the surrounding skin tones.

The color profile analysis converts the image to YCrCb color space, which separates luminance (Y) from chrominance (Cr and Cb), making it easier to isolate skin tones based on color characteristics rather than brightness. Then it isolates chrominance components to ensure that the blobs detected in previous steps fall within a specific skin color range. By integrating a histogram comparison approach, the algorithm quantifies the similarity between the blob's color distribution and the expected skin color profile. This ensures that only blobs closely resembling the skin's color properties are retained, improving the reliability of the detection process. This method provides robustness against variations in skin tone, making it less susceptible to lighting or color changes.

The validated keypoints for SimpleBlobDetector and Superpoint algorithms are denoted as $\tilde{\mathcal{B}}_{SBD}^{(m)}$ and $\tilde{\mathcal{B}}_{SP}^{(m)}$, and the detection results for $I^{(m)}$ are combined as the validated blob set $\tilde{\mathcal{B}}^{(m)} = \tilde{\mathcal{B}}_{SBD}^{(m)} \cup \tilde{\mathcal{B}}_{SP}^{(m)}$.

Single-Image Keypoint Deduplication

The detection results from both the OpenCV SimpleBlobDetector and SuperPoint detection are further fine-tuned after keypoint validation, this includes the removal of overlapped keypoints, which could occur in the following scenarios: (1) Single-method keypoint duplication: This occurs when a single detection method identifies the same keypoint multiple times. For example, this may happen if the method uses multiple window sizes or employs edge-sensitive algorithms that detect the same keypoint repeatedly. This occurs when different detection methods detect the same keypoint.

In the workflow, the combined detection results from the SimpleBlobDetector and Superpoint detection are utilized to identify a broader spectrum of features, from large, distinct blobs to small, point-like keypoints on human skin, which are critical for detailed analyses. To address single-method and cross-method keypoints duplication, a two-step deduplication approach is employed after combining the validated keypoints. The first step is Threshold-Based Filtering. A threshold is applied to identify keypoints with close centers. For any pair of keypoints $b_i$, $b_j \in \tilde{\mathcal{B}}^{(m)}$, with centers $p_i$ and $p_j$, we only retain them if $\|p_i - p_j\|_2 \leq \tau$ (pixels). In this pipeline, $\tau = 10$ is applied, which approximates to 1 mm in real scale within our system. The second step is Spatial Clustering. Following the threshold-based filtering, the Density-Based Spatial Clustering of Applications with Noise (DBSCAN) algorithm is used to group keypoints into clusters. DBSCAN identifies dense regions in the feature space while effectively handling noise. For each cluster, a representative keypoint is computed by taking the centroid of the keypoint centers and the maximum radius within the cluster to form the final deduplicated keypoint set for image $I^{(m)}$.

Patient-Level Keypoint Deduplication

After single-image deduplication, a set of validated keypoints $\tilde{\mathcal{B}}^{(m)}$ for each image $I^{(m)}$, where each $b \in \tilde{\mathcal{B}}^{(m)}$ is characterized by its 2D image location $p \in \mathbb{R}^2$, detected radius r, and additional attributes. To consolidate detections across multiple views of the same lesion, the following steps are performed:

3D Back-Projection

Each keypoint's 2D location is back-projected into the patient's 3D mesh $\mathcal{M}_\tau$ to obtain their 3D coordinates. For a keypoint detected in image $I^{(m)}$ with 2D location P, its corresponding 3D location $x^{(m)} \in \mathbb{R}^3$ is computed as:

$$x^{(m)} = C^{(m)} + \lambda^{(m)} R^{(m)T} K^{(m)-1} \begin{bmatrix} p \\ 1 \end{bmatrix},$$

where $C^{(m)} \in \mathbb{R}^3$ is the camera center for image $I^{(m)}$ (obtained from the projection matrix $p^{(m)} = K^{(m)}[R^{(m)}|t^{(m)}]$), $K^{(m)} \in \mathbb{R}^{3\times3}$ is the camera intrinsic matrix, $R^{(m)} \in SO(3)$ is the camera rotation matrix, $\lambda^{(m)} \in \mathbb{R}^+$ is a scalar determined by intersecting the back-projected ray with the patient's 3D mesh $\mathcal{M}_\tau$.

Incident Angle Computation

For each back-projected keypoint, the incident angle θ quantifies the obliqueness of the view. Define the view vector as $$v^{(m)} = \frac{x^{(m)} - C^{(m)}}{\|x^{(m)} - C^{(m)}\|},$$

and let $n^{(m)} \in \mathbb{R}^3$ be the surface normal of $\mathcal{M}_\tau$ at $x^{(m)}$. Then, the incident angle is given by:

$$\theta^{(m)} = \arccos\left(\frac{n^{(m)} \cdot v^{(m)}}{\|n^{(m)}\|\|v^{(m)}\|}\right).$$

Orthorectification

Due to the perspective effect, images of the skin lesion which are closer to the camera appear bigger than the images of objects seen from a distance. Moreover, if a skin fragment is oriented at an angle with respect to the optical axis of the camera, the resulting image has distorted proportions. This makes it difficult to judge the actual size and shape on 2D images. Although the size and shape can be measured on a 3D mesh reconstructed from 2D images, the visualization of orthorectified 2D images may be convenient for doctors to examine and for computerized methods to compare on the same baseline.

Given the properties of image projection onto the image sensor of the camera, the real shape and size of the skin lesion for 2D images can be reconstructed. For a lesion, a virtual camera coordinate system is constructed using the calculated incident angle ($\theta^{(m)}$) so that the camera is pointed at the centroid of the lesion. Its optical axis is antiparallel to the normal vector of the lesion. Such a virtual camera coordinate system is up to a rotation around its optical axis and can be flexibly defined per visualization software. With the 3D textured mesh reconstructed from the 2D TBP images, for each pixel in the virtual camera, its counterpart on the 3D mesh can be found, its texture coordinate in the texture image located, and its color information can be interpreted.

Spatial Clustering and Best-View Selection

All back-projected keypoints are aggregated into a single set:

$$\mathcal{X} = \bigcup_{m=1}^{N_T} \left\{ x_i^{(m)} : b_i \in \mathcal{B}^{(m)} \right\}.$$

A KD-Tree is employed to perform efficient nearest-neighbor searches. Keypoints within a spatial threshold (e.g., 1 mm) are grouped into clusters representing multiple detections of the same lesion. For each cluster, the cluster centroid is computed and a score for each keypoint is evaluated:

$$s = e^{-\alpha\theta} \cdot \frac{1}{d_{centroid}},$$

where $\alpha$ is a scaling factor, $\theta$ is the incident angle, $d_{centroid}$ is the Euclidean distance from the keypoint's 3D location to the centroid of its cluster.

The keypoint with the highest score in each cluster is selected as the representative detection. The collection of these representative keypoints forms the patient-level keypoint set $\tilde{\mathcal{B}}_P$.

Real-Scale Estimation

To translate image measurements into real-world dimensions, each camera is modeled as a pinhole camera with known parameters. For a keypoint with back-projected 3D location x captured from camera pose C, the physical size of one image pixel, $p_{phys}$ (in millimeters per pixel), is estimated by:

$$p_{phys} = \frac{\|x - C\| \cdot s_{sensor}}{f},$$

where $s_{sensor}$ is the physical size of a pixel on the camera sensor (in millimeters), and f is the focal length of the camera (in millimeters).

This conversion enables accurate measurement of keypoint dimensions in physical units, which is crucial for subsequent clinical analyses.

By combining keypoint detection for coarse lesion identification and SuperPoint for detailed keypoint extraction, this method provides a robust framework for detecting and analyzing skin lesions in wide-field TBP images. The approach is well-suited for wide-field clinical images where lesion resolution may be lower than in traditional dermoscopic images.

Lesion Classification and Ugly Duckling Analysis

After patient-level deduplication, a set of unique keypoints for each patient is obtained, each corresponding to a distinct lesion. This set is denoted by $$\tilde{\mathcal{B}}_P = \{b_i\}_{i=1}^{N_P},$$

where $N_P$ is the number of unique lesions detected for the patient. For each keypoint $b_i$, the deduplication process provides a best-view image $I^*_{(i)}$ and the corresponding 2D coordinates $P^*_{(i)} \in \mathbb{R}^2$ (with an associated radius $r_{(i)}$). These data are used to extract image patches that are subsequently classified.

Mapping Keypoints to 2D Image Patches

For each keypoint $b_i \in \tilde{\mathcal{B}}_P$, the inventive method performs cropping of the image patch from its corresponding image I(i) by:

$$I_{patch}^{(i)} = \text{Crop}(I_{(i)}, p_{(i)}, r_{(i)}).$$

These cropped patches are then used as input to the lesion classification network.

Lesion Classification

Lesion classification is evaluated by using several state-of-the-art deep learning architectures. Our classification pipeline is designed to distinguish among seven classes: Background (regions with no tissue of interest), Skin Edges (areas near the boundaries of skin), Bare Skin (normal skin without lesions), NSPL-A (nonsuspicious pigmented lesions type A, e.g., benign nevi, seborrheic keratosis, acrochordon, cherry angioma, lentigo), NSPL-B (nonsuspicious pigmented lesions type B, e.g., atypical moles, melanocytic/dysplastic nevus, melanosis), NSF (nonsuspicious skin features, e.g., anatomical structures such as nipples, armpits, nostrils, auricles), SPL (suspicious pigmented lesions, e.g., basal cell carcinoma, melanoma).

Model Architectures

The performance of several deep neural network architectures (using the inventive method) is evaluated, the architecture initialized with pre-trained weights on the ImageNet dataset:

VGG16 [Simonyan et al., 2015]: A 16-layer network employing small 3×3 convolutional filters.

EfficientNetB0 [Tan et al., 2020]: A baseline model balancing performance and efficiency via compound scaling.

ResNet50 [He et al., 2016]: A 50-layer residual network that utilizes skip connections to mitigate vanishing gradients.

Xception [Chollet et al., 2017]: An architecture based on depthwise separable convolutions.

MobileNet [Howard et al. 2017]: A lightweight network optimized for mobile and embedded devices.

In all cases, the pre-trained base is initially frozen while the top layers are replaced with new dense layers tailored for our 7-class problem. After initial training, the base is fine-tuned to further optimize performance.

Ugly Duckling and t-SNE Analysis

Following lesion classification, an analysis is performed to quantify the distinctiveness of each lesion and to visualize the overall feature distribution. The feature representations are extracted from the cropped keypoint images using a VGG16 model pretrained on ImageNet, with its classification layers removed. Let the feature extraction process be denoted as $\psi: \mathbb{R}^{H \times W \times C} \to \mathbb{R}^d$ so that for each image patch $$I_{patch}^{(i)},$$

a feature vector is obtained:

$$f^{(i)} = \psi(I_{patch}^{(i)}) \in \mathbb{R}^d.$$

To measure the "ugly duckling" (or distinctiveness) of each lesion, the centroid of the feature vectors for all $N_P$ unique lesions is first computed:

$$\bar{f} = \frac{1}{N_P}\sum_{i=1}^{N_P} f^{(i)}.$$

The distinctiveness score $o^{(i)}$ for lesion i is then defined as the cosine distance between its feature vector and the centroid:

$$o^{(i)} = \text{MinMax}\left(1 - \frac{f^{(i)} \cdot \bar{f}}{\|f^{(i)}\|\|\bar{f}\|}\right),$$

where the MinMax function scales the scores to the range [0,255] Lesions with higher $o^{(i)}$ values are considered more distinctive and may be indicative of a higher likelihood of malignancy.

In addition to the ugly duckling scoring, t-distributed Stochastic Neighbor Embedding (t-SNE) is employed to visualize the high-dimensional feature space in two or three dimensions. Let the t-SNE transformation be denoted as $\phi$: $\mathbb{R}^d \rightarrow \mathbb{R}^k$ with k=2 for visualization, we apply $\phi$ to each feature vector yields:

$$z^{(i)} = \phi(f^{(i)}) \in \mathbb{R}^k.$$

The set of embeddings $$\{z^{(i)}\}_{i=1}^{N_P}$$

is then visualized as a scatter plot. Lesions with higher distinctiveness scores $o^{(i)}$ will appear as outliers or form sparse clusters in the t-SNE plot, highlighting them for further clinical evaluation.

Figure 2:
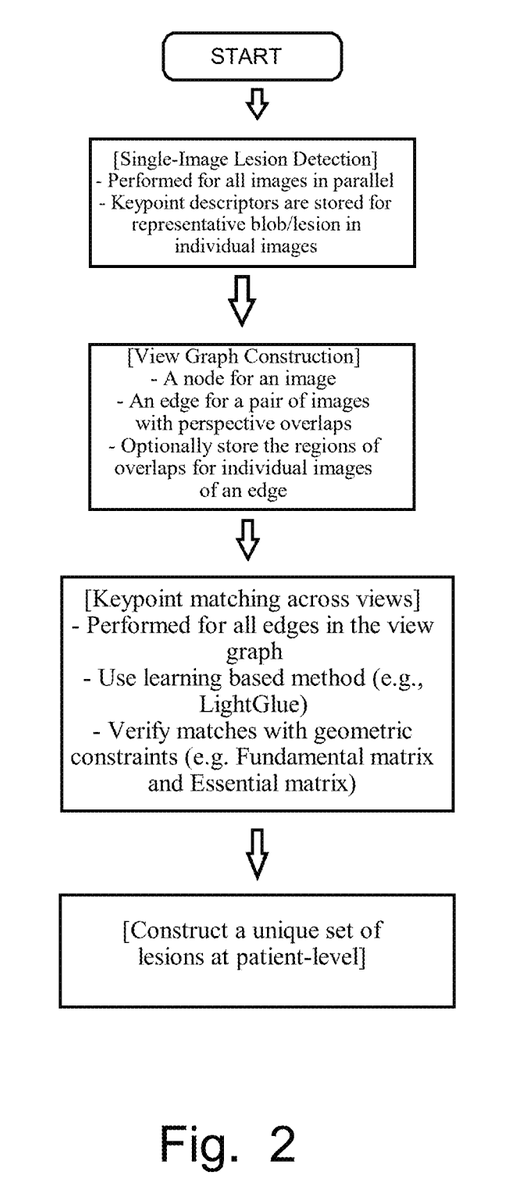
FIG. 2 shows an embodiment of the patient-level deduplication that is accelerated using the prior knowledge from total body photography and integrated with 3D reconstruction.

Keypoint-Integrated Lesion Detection and 3D Reconstruction:

The 3D back-projection is an expensive operation. Instead of performing the 3D reconstruction and lesion detection in sequence, the common steps of keypoints detection in the two tasks can be merged. In addition, the keypoint matching of 3D reconstruction can be leveraged to remove duplicate lesions to avoid the expensive 3D back-projection. Moreover, in the context of total body photography, images are not unordered nor unstructured. Relying on either calibrated camera poses from a TBP system or the anatomical landmarks (e.g., body joints) in the image, a view graph can be constructed for more efficient keypoint matching.

The following is an embodiment of the patient-level deduplication that is accelerated using the prior knowledge from total body photography and integrated with 3D reconstruction.

View Graph Construction:

A view graph represents the connectivity of images captured in a scan. A connection (as an edge) between a pair of images (two nodes) encodes that the image pair has overlapping viewpoints. A view graph can be constructed for total body photography from 1) the calibrated camera poses and 2) the anatomical position a camera is looking at.

With calibrated camera poses, the overlapping viewpoints for a pair of images can be computed given the designated volume of the scan. The overlapping viewpoints for a pair of images can be stored as the edge information of the image pair so that only the keypoints within the overlap need to be matched. Without calibrated camera poses, the view graph can be constructed by identifying body joints and facial features (e.g. OpenPose [Cao et al., 2017] and Mediapipe [Lugaresi et al., 2019]) in the images and considering the working space of the cameras based on the field of view and an estimation of the subject-to-camera distance.

While view graphs or visibility graphs are implicitly formed in many Structure from Motion systems through the creation of "tracks" (sets of matched features across multiple images), the explicit formulation and application of such a graph for the specific purpose of patient-level lesion deduplication within a single TBP scan session is a targeted contribution.

Patient-Level Deduplication Integrated with 3D Reconstruction

Given a scene graph for all the TBP images and detected keypoints in individual images, we perform keypoint matching (e.g. LightGlue [Lindenberger et al., 2023]) for every edge (a pair of images with overlaps) in the scene graph. Keypoint matching is the process of identifying corresponding keypoints between two or more images based on the similarity of their keypoint descriptors. A keypoint descriptor is a numerical representation (often a vector) of the region around a keypoint, encoding its appearance, shape, or texture, enabling comparison and matching of keypoints.

We note that the keypoints to be matched can be narrowed down to the overlap regions within images if the information is stored in the edge information. Once the matched keypoints are verified using geometric constraints such as epipolar geometry and Random Sample Consensus to filter bad matches. For lesions appearing in overlapping image pairs, the previously established keypoint matches (that fall within or near lesion boundaries) are used to create a unique lesion, established as a track in the structure from motion, wherein the track is a 3D point where a connection is established for its 2D observations in multiple images.

Figure 3:
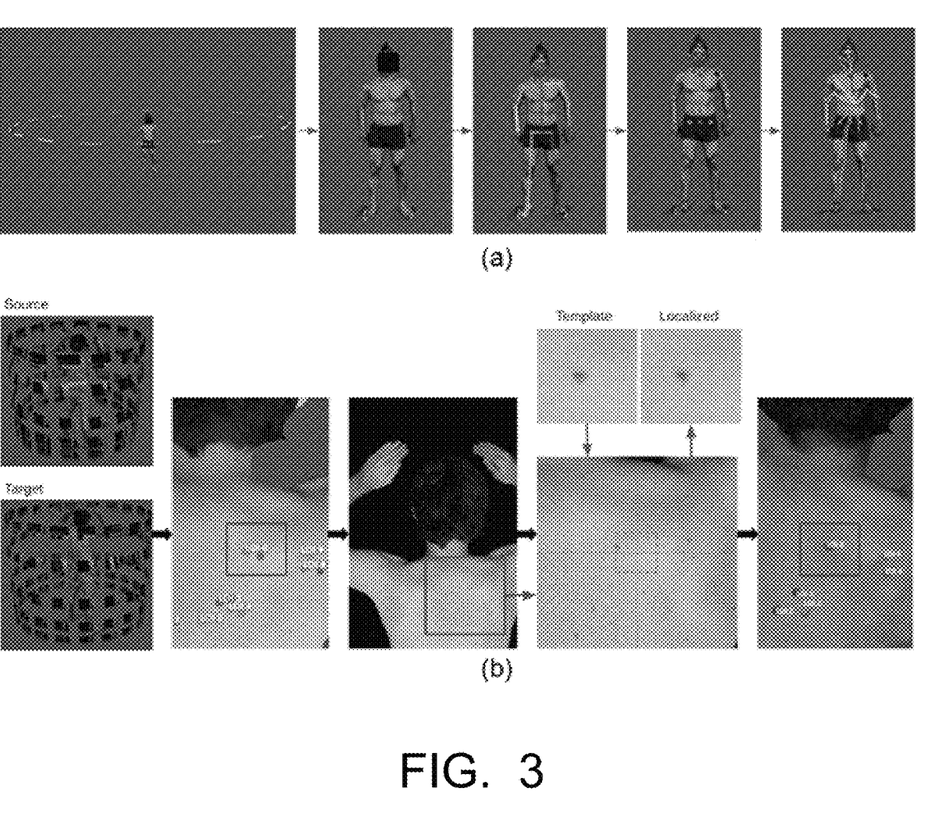

Lesion Matching Across Scans:

Once lesions are detected for both a source and a target scan, lesions in correspondence have to be established to analyze lesion evolution. This invention provides solutions to the cases when: 1) both 2D images and 3D meshes are available, and 2) when only 3D meshes are available. The 2D images provide clearer details in texture as compared to 3D meshes, since both the errors in estimating the geometry of the 3D surface and the misalignment of cameras result in degraded texture on the 3D mesh during the mesh texturing step. However, using 2D images for lesion matching is constrained under the assumption that similar body poses and camera perspectives are present in the source and the target scans, so that a similar appearance of the lesion and its surroundings can be found in images across scans.

The following is an embodiment of lesion matching when both 2D images and 3D meshes of total body photography are available, wherein the 3D meshes are reconstructed from the 2D images. The first step is to construct a coarse correspondence map between the source and target scan using body landmarks, such as body joints and facial keypoints. The second step is to find corresponding pairs of 2D wide-field-of-view images in the source and the target. Once a pair of images in correspondence is found, we can perform lesion matching using keypoint matching for paired images (e.g., Superpoint [DeTone et al., 2018] and LightGlue [Lindenberger et al., 2023]). Finally, for the matched lesions, we can refine the location of the lesions in correspondence using template matching.

Landmark-Based Correspondence Map

Given a 3D textured mesh $\mathcal{M}$, an orbital path is created around the mesh to generate virtual cameras and a synthetic 2D image at each camera position. For each synthetic 2D image, a learning-based method is used to detect facial features and body joints. Similar to BODYFITR [Saint et al., 2019]), the 3D locations of body landmarks on the textured mesh can be derived through back-projection: For a landmark detected in a 2D synthetic view at the homogeneous coordinate $p=[p_x,p_y,1]^T$, its 3D coordinate can be represented as $l=K^{-1}\in \mathfrak{R}^3$, where K is a 3×4 camera matrix. A 3D ray is defined with the camera position $c\in R^3$ as its origin and with the ray direction $(l-c)\in R^3$. Finally, ray-casting is applied to get the intersection between the 3D ray and the mesh. A vertex $v\in \mathcal{M}$ on the surface for each landmark is estimated to enable the computation of geodesic distance along the surface in subsequent steps. Note that there could be multiple candidates for the 3D point locations of the landmarks from multiple synthetic views. The confidence level of the predicted landmarks can be used to select the best view for each landmark and then calculate the 3D location of the landmark from the selected view.

For each vertex $v\in R^3$ in the 3D mesh with S landmarks $L=\{l_i\}$, $l_i\in R^3$, $i=1 \mapsto S$, it can mapped into a S-dimensional vector representation based on the geodesic distances from the vertex to all the landmarks. Formally, the mapping $z_{shape}: R^3 \mapsto R_S$ can be defined as:

$$z_{shape}(v)=[f(g(v,l_1),f(g(vl_2), \ldots ,f(g(v,l_S)]^T \in R^S,$$

where $g(v,l_i)$ is the geodesic distance between the vertex v and the $i^{th}$ landmark, and $f(\bullet)$ is a function of geodesic distance.

The feature representation of a vertex should give preference to closer landmarks when the similarity between two feature vectors are compared. Therefore, after experimenting with $$f(g) = \sqrt{\frac{1}{g}}, f(g) = \frac{1}{g}, f(g) = \frac{1}{g^2},$$

and $f(g)=maxG-g$, $G=\{g\ (v,l_i)\}$ and empirically it was discovered that $$f(g) = \frac{1}{g}$$

gives the best descriptiveness as a feature representation. Therefore, the selected shape feature representation of a vertex is:

$$z_{shape}(v) = \left[\frac{1}{g(v,l_1)}, \frac{1}{g(v,l_2)}, \ldots , \frac{1}{g(v,l_S)}\right]^T \in R^S.$$

Paired Views Selection

From the coarse correspondence map, for each vertex in the source, its correspondence in the target in the 3D mesh can be derived. Starting from a lesion of interest (LOI) in the source, we locate its corresponding vertex in the target is located. To select a pair of source and target views for the lesion of interest, we define a notion of the view quality of a lesion in a 2D image by the camera-to-lesion distance and the incident angle from the camera to the lesion. Let $v\in \mathcal{M}$ be the vertex for an LOI and $n\in \mathfrak{R}^3$ be the normal vector of the vertex, for a given camera view with camera position $c\in \mathfrak{R}^3$, the view quality $\zeta$ for the lesion can be defined as: be the vertex for an LOI and be the normal vector of the vertex, for a given camera view with camera position, the view quality for the lesion can be defined as:

$$\zeta = -\frac{(v-c)\cdot n}{\|v-c\|}.$$

Therefore, the view selection among a set of camera views in is the same as solving:

$$c^* = \arg\max_{c\in C} -\frac{(v-c)\cdot n}{\|v-c\|}.$$

Template Matching

For a source LOI, given a fixed crop size W×H in pixels enclosing the lesion, a template image for the LOI can be acquired as $I_{template}$. Template matching is then used to refine the pixel coordinate $(p_x,p_y)$ of the LOI on a selected target 2D image $I_{target}$:

$$(p_x^*, p_y^*) = \arg\max_{(p_x,p_y)\in I_{target}} ssim(I_{template}, I_{crop}(p_x, p_y)),$$

where $I_{crop}(p_x,p_y)$ is the crop image centered at $(p_x,p_y)$ with size W×H, and ssim(•,•) is the similarity measure of two images. Template matching has been well-studied in the literature with popular metrics proposed, such as normalized cross-correlation, structural similarity index [Wang et al., 2004], and LPIPS [Zhang et al., 2018], a deep-learning-based method to transform images into deep embeddings for perceptual comparison.

The window size for template matching is 25×25 pixels, while the search region is 100×100 pixels in an original image of resolution 580×870 pixels. Template matching is performed by using normalized cross-correlation (NCC) and LPIPS scores as the metrics. It was discovered empirically that NCC is more discriminative for comparing images with high similarities whereas the LPIPS score is more robust to the change of perspective. Therefore, if the 2D TBP images share many common perspectives, the optimal matched result from NCC cab be used if its LPIPS score is higher than a threshold (0.9). Otherwise, the remaining sub-optimal matches from NCC with the highest LPIPS score are selected.

Figure 4:
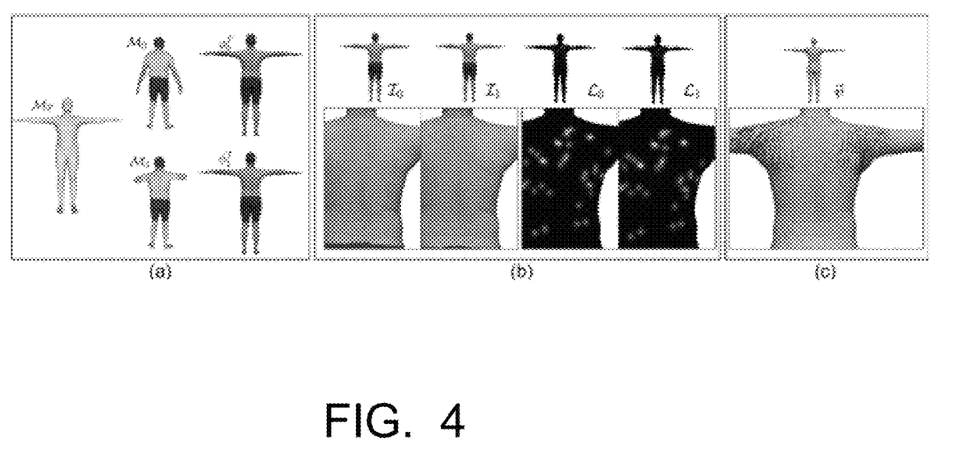

The following is an embodiment of lesion matching using 3D textured mesh of total body photography.

Problem Statement

Given a template mesh $\mathcal{M}_\tau$, source and target meshes $\mathcal{M}_0, \mathcal{M}_1$, and two sets of detected lesions $X_0 \subset \mathcal{M}_0$, $X_1 \subset \mathcal{M}_1$, we would like to find correspondence maps $$\phi_0^T: \mathcal{M}_0 \to \mathcal{M}_T$$

and $$\phi_1^{\mathcal{T}}:\mathcal{M}_1 \to \mathcal{M}_{\mathcal{T}},$$

and a matching matrix $\pi=\{0, 1\}^{(|X_0|+1)\times(|N_1|+1)}$ minimizing an energy of consisting of two terms:

$$E_{X_0,X_1}(\phi_0^{\mathcal{T}}, \phi_1^{\mathcal{T}}, \pi) = \sum_{X_0,X_1} E_{DistanceProximity}(\phi_0^{\mathcal{T}}, \phi_1^{\mathcal{T}}, \pi) + E_{Stochasticity}(\pi).$$

That is, it is beneficial to have a pair of corresponding source and target lesions to be close to each other while encouraging the correspondence matrix to be doubly stochastic.

By adding a dummy lesion to each of the lesion sets in $\pi$, the matching function can be used to account for unmatchable lesions. Specifically, assuming a lesion in the source scan can be matched to at most one lesion in the target scan and vice versa, we also enforce:

$$\sum_{j=0}^{|X_1|} \pi_{i,j} \;\&= 1, \forall\, i = 1, \ldots, |X_0|$$

$$\sum_{i=0}^{|X_0|} \pi_{i,j} = 1, \forall\, j = 1, \ldots, |X_1|$$

(where $\pi_{i,0}=1$ indicates a match between the i-th lesion on the source and the target's dummy lesion). Since the dummy lesions can be matched multiple times, the sums involving the dummy lesions can be greater than 1.

Template-Based Coarse Correspondence

The first step is constructing a coarse correspondence map between the source/target and a template mesh. The approach from Marin et al. [Marin et al., 2024] can be used to acquire a deformed template mesh registered to the source/target mesh that allows the correspondence map to be constructed.

Given an input mesh, they (Marin) propose a localized neural fields network in which a neural field is dedicated to a local region of body shape to predict the vertex displacement of the template mesh (SMPL [Loper et al., 2023] model). The parameters of the neural field are then refined using Iterative Closest Point [Besl et al., 1992] through backpropagation. Then, the updated neural field is utilized to register the SMPL model to the input, followed by a refinement that optimizes Chamfer distance.

The method is denoted by SMPL-NICP. Let $\mathcal{M}_\tau$ be the template mesh, for an input mesh $\mathcal{M}_i$, i={0, 1}, the output from SMPL-NICP is a deformed template mesh (i.e. with the same topology as the original template) whose geometry is registered to that of $\mathcal{M}_i$.

A correspondence map $$\phi_i^{\mathcal{T}}:\mathcal{M}_i \to \mathcal{M}_{\mathcal{T}},$$

is defined by first deforming the template mesh to $\mathcal{M}_i$ and then finding, for every point $p \in \mathcal{M}_i$, the nearest surface point on the deformed template.

Similarly, a correspondence map $$\phi_{\mathcal{T}}^i:\mathcal{M}_{\mathcal{T}} \to \mathcal{M}_i$$

by finding the closest surface point on the input mesh $\mathcal{M}_i$ for each point on the deformed template mesh. It should be noted that and $\phi_i^\tau$ are $\phi_\tau^i$ not inverses of each other since two different points on the source/target can have the same closest point on the deformed template Lesions can be located anywhere on the surface on the mesh (i.e. not restricted to vertex positions, as in existing work, e.g., [Zhao et al., 2022; Ahmedt-Aristizabal et al., 2023; Huang et al., 2023]). To this end, we use barycentric coordinates to encode a point on the mesh: $p \in \mathcal{M} \leftrightarrow (t^p, \{\alpha^p, \beta^p, \gamma^p\})$ where $t^p$ indexes the triangle containing p and $\{\alpha^p, \beta^p, \gamma^p\}$ are the barycentric coordinates of P inside the triangle ($0 \le \alpha^p, \beta^p, \gamma^p \le 1$ and $\alpha^p+\beta^p+\gamma^p=1$).

Using this encoding, we represent mesh correspondences as vertex-to-surface-point maps, taking the vertices on one mesh to points on the second mesh:

$$\Phi_i^j:\mathcal{V}_i \to \mathcal{M}_j$$

is represented by a $\mathbb{R}^{|V_i|\times 4}$ matrix. The $l^{th}$ row in $\Phi_i^j$, maps the $l^{th}$ vertex $$v_i^l \in \mathcal{V}_i$$

to a point in $\mathcal{M}_j$ in the barycentric encoding.

Given a vertex-to-surface-point correspondence map $$\Phi_i^j:\mathcal{V}_i \to \mathcal{M}_j,$$

barycentric encoding is used to extend it to a surface-point-to-surface-point correspondence map $$\phi_i^j:\mathcal{M}_i \to \mathcal{M}_j.$$

Concretely, to find the correspondence of a surface point $p \in \mathcal{M}_i$ to the mesh $\mathcal{M}_j$, three vertices of the triangle containing the point p are mapped onto the mesh $\mathcal{M}_j$, interpolate the positions of the imaged vertices using the barycentric coordinate of p, and then find the point on $\mathcal{M}_j$ closest to the interpolant.

Formally, for a point $$p \leftrightarrow (t^p, \{\alpha^p, \beta^p, \gamma^p\}) \in \mathcal{M}_i \text{ with } \mathcal{F}_i(t^p) = (v_0^p, v_1^p, v_2^p)$$

representing the triangle containing p, we have:

$$\phi_i^j = \arg\min_{q \in \mathcal{M}_j} \left\| \alpha^p \cdot \Phi_i^j(v_0^p) + \beta^p \cdot \Phi_i^j(v_1^p) + \gamma^p \cdot \Phi_i^j(v_2^p) - q \right\|.$$

Flow-Field-Based Refinement

The template-based correspondence maps are coarse for two reasons. First, when fitting a template mesh to source/target scan, non-isometric deformation is present at locations near body joints and locations of soft tissues. Second, misalignment between the deformed template mesh and the input mesh occurs if the body pose of the input mesh is far from the canonical "T" pose. Since the coarse correspondence map relies on the nearest point on the registered template mesh to the query point, such a misalignment degrades the accuracy of the mapping. Consequently, a pair of corresponding points in the source and the target will not map to the same position on the template mesh. To refine the correspondence map, the texture and lesion signals of the source/target are transferred to the template mesh using the source/target-to-template correspondences. A vector field on the template mesh that aligns the transferred signals is then constructed.

Signal Construction on Template Mesh:

Let $F_i: \mathcal{M}_i \to \mathbb{R}$ be a signal on mesh $\mathcal{M}_i$, the signal is transferred to the template mesh using the correspondence map, to define a signal on the template $$F_i^{\mathcal{T}} \equiv F_i \circ \phi_{\mathcal{T}}^i : \mathcal{M}_{\mathcal{T}} \to \mathbb{R}.$$

two types of input signals are considered:

Texture Signal:

A triplet of color signals is constructed on the template mesh, using the colors in the texture map acquired by the TBP, $$\mathcal{I}_0^c, \mathcal{I}_1^c : \mathcal{M}_{\mathcal{T}} \to \mathbb{R}, \text{ with } c \in \{R, G, B\}.$$

Lesion Signal

Lesion signals are constructed on the template mesh using lesion signals defined on the source/target meshes, $\mathcal{L}_0, \mathcal{L}_1$, $\mathcal{M}_\tau \to \mathbb{R}$. The source/target lesion signals represent the likelihood of a surface point being a lesion. To create the lesion signal, one can diffuse a sum of delta functions centered at the lesion positions and normalize the signal across the surface with the maximum signal value to create a scalar-per-vertex signal.

Surface Optical Flow

Given a template mesh $\mathcal{M}_\tau$, source/target texture signals $$\mathcal{I}_0^c, \mathcal{I}_1^c,$$

and source/target lesion signals $\mathcal{L}_0, \mathcal{L}_1$, the goal is to define a tangent vector field $\vec{v}$ on the template mesh such that advection along the field best aligns the source and target signals. The approach of Prada [Prada et al., 2016] is employed, defining the flow field $\vec{v}$ as the minimizer of the energy:

$$E(\vec{v}) = w_I \cdot \underbrace{\sum_{i \in \{0,1\}, c \in \{R,G,B\}} \int_{\mathcal{M}_{\mathcal{T}}} (\langle \nabla \mathcal{I}_i^c, \vec{v} \rangle - (\mathcal{I}_0^c - \mathcal{I}_1^c))^2 dp}_{\text{texture fitting}} +$$

$$w_{\mathcal{L}} \underbrace{\sum_{i=0}^{1} \int_{\mathcal{M}_{\mathcal{T}}} (\langle \nabla \mathcal{L}_i, \vec{v} \rangle - (\mathcal{L}_0 - \mathcal{L}_1))^2 dp}_{\text{lesion fitting}} + \epsilon \cdot \underbrace{\int_{\mathcal{M}_{\mathcal{T}}} \nabla \vec{v}(p)^2 dp}_{\text{smoothness}} + \varepsilon \cdot \underbrace{\int_{\mathcal{M}_{\mathcal{T}}} \vec{v}(p)^2 dp}_{\text{size}}$$

with the first and the second terms penalizing the failure of the vector field to explain the difference in the texture signal and the lesion signal respectively, the third term encouraging the smoothness of the flow, and the fourth term regularizing the norm of the flow to respect the initial correspondence map. We follow the approach proposed by Prada et al., solving for the flow field $\vec{v}$ hierarchically.

Update of Correspondence Map

With the vector field $\vec{v}$ defined on $\mathcal{M}_\tau$, the correspondence map $\phi_0^\tau$ and $\phi_1^\tau$ is updated by advecting the positions of correspondence forward and backward along the vector field halfway, separately. Formally, we have:

$$\phi_0^{\mathcal{T}}(p) \leftarrow \exp_{\phi_0^{\mathcal{T}}(p)} \frac{\vec{v}(\phi_0^{\mathcal{T}}(p))}{2},$$

$\forall p \in \mathcal{M}_0$ and $$\phi_1^{\mathcal{T}}(p) \leftarrow \exp_{\phi_1^{\mathcal{T}}(p)} \frac{-\vec{v}(\phi_1^{\mathcal{T}}(p))}{2},$$

$\forall p \in \mathcal{M}_1$ with $\exp_p : T_p \mathcal{M}_\tau \to \mathcal{M}_\tau$ the exponential map taking vectors in the tangent space at $p \in \mathcal{M}_\tau$ to positions on $\mathcal{M}_\tau$.

Lesion Assignment

Given source/target correspondence maps $$\phi_i^{\mathcal{T}} : \mathcal{M}_i \to \mathcal{M}_{\mathcal{T}},$$

one expects lesions, $x_0 \in X_0$ and $x_1 \in X_1$ to be in correspondence if the geodesic distance between $$\phi_0^{\mathcal{T}}(x_0)$$

and $$\phi_1^{\mathcal{T}}(x_1)$$

is small. Conversely, one expects $x_0 \in X_0$ (resp. $x_1 \in X_1$) to be unmatched if the geodesic distance from $$\phi_0^{\mathcal{T}}(x_0) \text{ to } \phi_1^{\mathcal{T}}(x_1)$$

for all $x_1 \in X_1$ (resp. from $$\phi_1^{\mathcal{T}} \text{ to } \phi_0^{\mathcal{T}}(x_0)$$

for all $x_0 \in X_0$) is large. These observations are formalized, expressing the assignment matrix $\pi \in \{0, 1\}^{(|X_0|+1) \times (|X_1|+1)}$ as the minimizer of the energy:

$$E_{X_0,X_1}(\pi) = \alpha \sum_{x_0 \in X_0, x_1 \in X_1} \pi(x_0, x_1) \cdot D_{\mathcal{T}}(\phi_0^{\mathcal{T}}(x_0), \phi_1^{\mathcal{T}}(x_1)) +$$

$$\beta \left[ \sum_{x_0 \in X_0} \pi(x_0, x_1^{|X_1|+1}) + \sum_{x_1 \in X_1} \pi(x_0^{|X_0|+1}, x_1) \right]$$

where $D_\tau : \mathcal{M}_\tau \times \mathcal{M}_\tau \to \mathbb{R}^{\geq 0}$ is the geodesic distance function on $\mathcal{M}_\tau$. The assignment problem can be optimized through the Kuhn-Munkres algorithms [Munkres et al., 1957]. The implementation in Pygmtools is followed [Wang et al., 2024] to solve the minimizer to the equation above.

Figure 5:
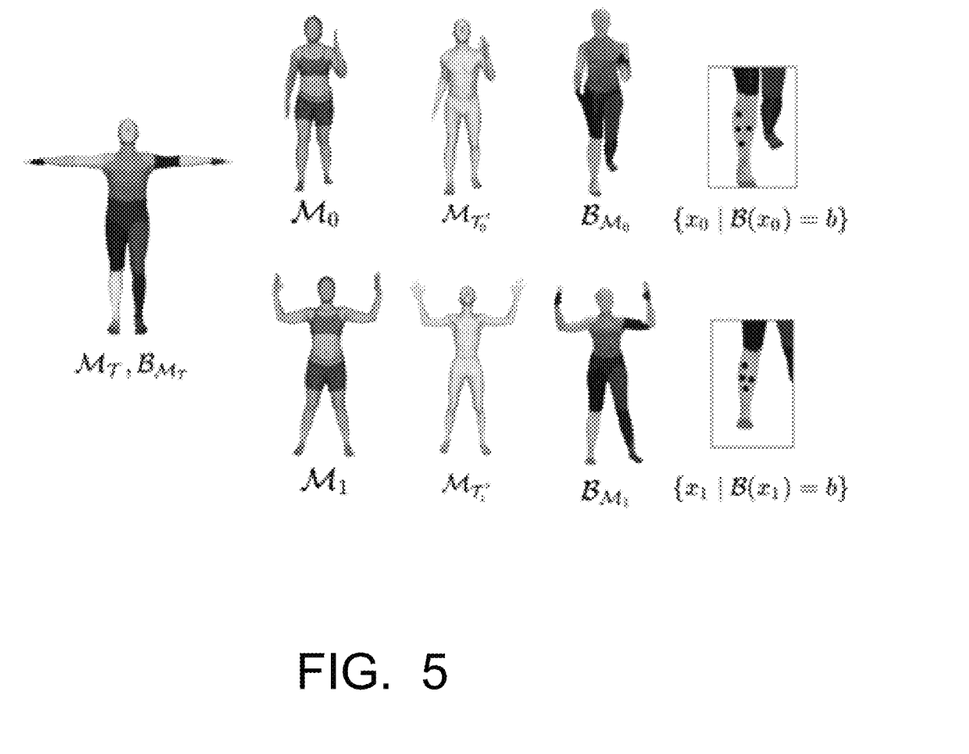
FIG. 5 illustrate a process of lesion matching verification using piece-wise rigid body assumption for 3D textured mesh.

The following is an embodiment of lesion matching verification using piece-wise rigid body assumption for 3D textured mesh. Given matches $\{(x_0, x_1), x_0 \in X_0, x_1 \in X_1\}$ for detected lesions in the source and target scans, we define the level of confidence for matches based on piece-wise rigid body assumption for a group of at least 3 lesions.

Lesion Partitioning

A body segmentation $\mathcal{B} \mathcal{M}_\tau$ defined in a template mesh is relied upon $\mathcal{M}_\tau$ to partition lesions into body segments, $\mathcal{B} \mathcal{M}_\tau : \mathcal{V}_\tau \to \{1, \ldots, B\}$, $\mathcal{V}_\tau \in \mathcal{M}_\tau$. By deforming the template mesh to fit a given 3D mesh, the body part label is assigned to each lesion using the label of the closest vertex on the deformed SMPL model. Let $\mathcal{M}_{\tau'}$ be the deformed template mesh and $\mathcal{M}$ be a given mesh, for a lesion $x \in \mathcal{M}$ there is:

$$\mathcal{B} \mathcal{M}(x) = \mathcal{B} \mathcal{M}_{\tau'(v^*(x)), v^*(x) = \arg\min_{v \in \mathcal{M}_{\tau'}} |v - x|}$$

Rigid Transformation for Body Segment

For a body segment labeled as $b \in \{1, \ldots, B\}$, a rigid transformation is estimated $H \in SE(3)$ to align the two sets of lesion pairs that at least one of the lesion in a lesion pair belongs to the body segment:

$$H = \arg\min_{R,t} \sum_{\pi(x_0,x_1)=1 \wedge (\mathcal{B}(x_0)=b \vee \mathcal{B}(x_1)=b)} \|x_1 - H(R, t)x_0\|^2,$$

where $R \in SO(3)$ is the rotation and $t \in \mathfrak{R}^3$ is the translation of components of H. We note that the correct matches at the body segment should give us the minimum sum for all possible matching permutations. In practice, given initial corresponding pairs, the matches are verified if the associated cost is a local minimum using the Iterative Closest Points algorithm.

Figure 6:
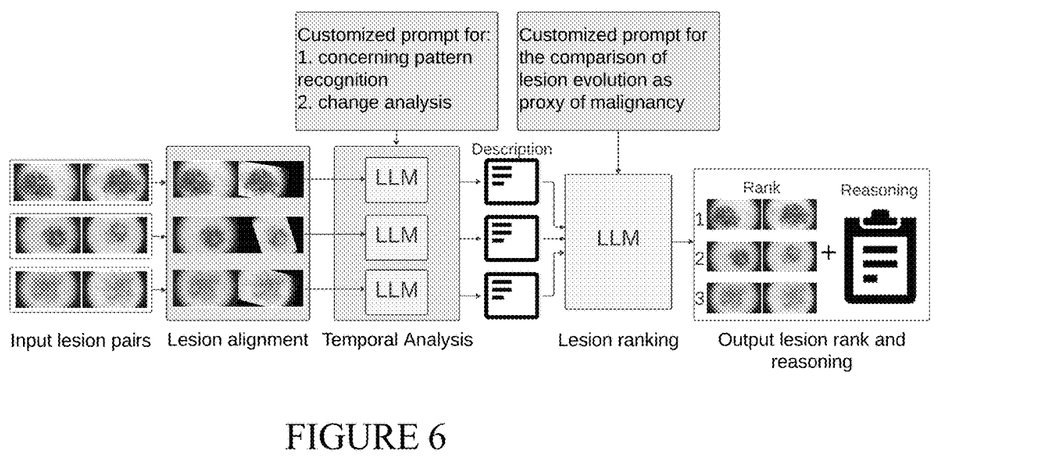
FIG. 6 shows a workflow to identify dynamic ugly ducklings using LLMs.

Dynamic Ugly Duckling Detection:

The following is an embodiment of the dynamic ugly duckling detection method. For every skin lesion, a pair of temporal images of the lesion are aligned and then a textual description regarding suspicious patterns and evolution of the lesion using LLM is obtained. Descriptions for all the lesions are aggregated, and have an LLM rank them considering the rate of transformation, as a proxy of risk level of malignancy.

Prompt Engineering for Dermatological Background

To standardize the response from LLM and provide dermatological knowledge to LLM, prompt engineering is performed for several iterations and converge to a system prompt. The information of the five following diagnosis algorithms is provided to the model, describe how each algorithm works and how they are evaluated, and then ask the LLM to provide the analysis.

1. ABCD Rule Analysis: Asymmetry (A), Border (B), Color (C), Diameter (D).
2. Structural Pattern Analysis:
    Lines: Evaluate types such as Reticular, Branched, Parallel, Radial, and Curved.
    Dots: Small, uniform, round structures.
    Clods: Larger, irregular pigmented or unpigmented areas.
    Circles: Arrangements of dots forming equidistant circular patterns.
    Pseudopods: Short peripheral projections that occur with another pattern.
    Pattern Recognition: A pattern is significant when a basic element repeats over at least approximately 25% of the lesion; assessing both symmetry and irregularity.
3. Color Pattern Analysis: Identify the colors presented in the lesion, and their possible causes.
    Melanin Distribution: Black: Located in the stratum corneum. Brown: Located in the basal epidermis. Gray: Located in the papillary dermis. Blue: Located in the reticular dermis.
    Hemoglobin-Related Colors: Range from bright red to dark red/blue (hemorrhage or coagulated blood).
    Other Colors: Orange (eroded lesions). White: fibrosis or sclerosis of the dermis.
4. Chaos and Clues: Detects overall asymmetry (chaos) and identifies specific malignant clues.
    Chaos: Definition: Asymmetry in structure or color; any line through the lesion showing dissimilarity indicates chaos. Identify if clues to Malignancy exist: (1) Eccentric structureless area (2) Black dots or clods, peripheral (3) Lines radial or pseudopods, segmental (4) Gray or blue structures (5) Polymorphous vessels (6) White lines (7) Lines reticular or branched, thick (8) Lines parallel, ridges (acral skin).
5. Seven-Point Checklist: Provide an additional scoring system for dermoscopic evaluation.
    Criteria:—Atypical pigment network (initially 2 points; revised versions may assign 1 point per criterion)—Blue-whitish veil (2 points)—Atypical vascular pattern (2 points)—Irregular streaks (1 point)—Irregular dots/globules (1 point)—Irregular blotches (1 point)—Regression structures (1 point) Interpretation: A cumulative score of 3 or more indicates high risk of melanoma.

The model is then used to categorize the lesions into the following categories based on prior analysis. The model needs to analyze why or why not the lesion image belongs to each category and provide the confidence level (very high/high/medium/low). The categories include: Melanoma In Situ, Melanoma (Invasive), Nevus (Benign), Solar Lentigo/Seborrheic Keratosis (SebK)/Lichen Planus-like Keratosis (LPLK), Ink Spot Lentigo, Basal Cell Carcinoma (BCC), Pigmented Intraepithelial Carcinoma (pIEC)/Bowen's Disease/SCC in situ, Hemangioma/Hemorrhage, Dermatofibroma, Other Lesions.

Finally the model is tasked to provide any additional assessments and recommendations.

Lesion Alignment

The images from two different instances (two time-points) of the same lesion are aligned before further analysis. Keypoints are detected with AKAZE [Alcantarilla et al., 2011] in both the source and the target image.

The AKAZE keypoints are matched by comparing the similarity of the descriptors of AKAZE keypoints. KNN matching is used with a Lowe's ratio test of a threshold of 0.75 to filter bad matches. With a minimum of 3 pairs of keypoints, a 2D affine transformation is estimated with Random Sample Consensus and then applied to the target image to be aligned with the source image. Then the reprojection error is computed to verify matches after the alignment. The final alignment is plotted by a side-by-side comparison of two instances with an indication of successful matches (with a reprojection error smaller than 5 pixels) in colored lines.

LLMs are used as two roles in the workflow: 1) a documenter to describe suspicious patterns and the evolution of a lesion and 2) a dynamic ugly duckling ranker to rank all the lesions based on the rate of transformation.

Lesion Documenter

In this step, an LLM evaluates suspicious patterns and the growth of a lesion from a pair of original temporal images, an image of alignment, following a system prompt of clinical criteria in dermatology. The documenter will write the clinician's notes for every lesion. The documenter is also instructed to carefully examine the image alignment based on the number of successful matches.

Dynamic Ugly Duckling Ranker

In this step, all the notes by the Lesion Documenter are aggregated. From all the aggregated notes, the model is instructed to rank all the lesions based on the rate of transformation as an indication of the risk of malignancy of a lesion.

REFERENCE

1. DeTone, Daniel, Tomasz Malisiewicz, and Andrew Rabinovich. "Superpoint: Self-supervised interest point detection and description." Proceedings of the IEEE conference on computer vision and pattern recognition workshops. 2018.
2. Lindenberger, Philipp, Paul-Edouard Sarlin, and Marc Pollefeys. "Lightglue: Local feature matching at light speed." Proceedings of the IEEE/CVF International Conference on Computer Vision. 2023.
3. Simonyan K, Zisserman A. 2015. Very deep convolutional networks for large-scale image recognition. Available from: https://arxiv.org/abs/1409.1556
4. Tan M, Le Q V. 2020. Efficientnet: Rethinking model scaling for convolutional neural networks. Available from: https://arxiv.org/abs/1905.11946.
5. He K, Zhang X, Ren S, Sun J. 2016. Deep residual learning for image recognition. In: 2016 IEEE Conference on Computer Vision and Pattern Recognition (CVPR). p. 770-778.
6. Chollet F. 2017. Xception: Deep learning with depthwise separable convolutions. Available from: https://arxiv.org/abs/1610.02357.
7. Howard A G, Zhu M, Chen B, Kalenichenko D, Wang W, Weyand T, Andreetto M, Adam H. 2017. Mobilenets: Efficient convolutional neural networks for mobile vision applications. Available from: https://arxiv.org/abs/1704.04861.
8. Cao, Z., Hidalgo, G., Simon, T., Wei, S., & Sheikh, Y. (2018). OpenPose: Realtime Multi-Person 2D Pose Estimation Using Part Affinity Fields. IEEE Transactions on Pattern Analysis and Machine Intelligence, 43, 172-186.
9. Lugaresi, Camillo, et al. "Mediapipe: A framework for perceiving and processing reality." Third workshop on computer vision for AR/VR at IEEE computer vision and pattern recognition (CVPR). Vol. 2019. 2019.
10. Wang, Zhou, et al. "Image quality assessment: from error visibility to structural similarity." IEEE transactions on image processing 13.4 (2004): 600-612.
11. Zhang, Richard, et al. "The unreasonable effectiveness of deep features as a perceptual metric." Proceedings of the IEEE conference on computer vision and pattern recognition. 2018.
12. Marin, Riccardo, Enric Corona, and Gerard Pons-Moll. "NICP: neural ICP for 3D human registration at scale." European Conference on Computer Vision. Cham: Springer Nature Switzerland, 2024.
13. Loper, Matthew, et al. "SMPL: A skinned multi-person linear model." Seminal Graphics Papers: Pushing the Boundaries, Volume 2. 2023. 851-866.
14. Besl, Paul J., and Neil D. Mckay. "Method for registration of 3-D shapes." Sensor fusion IV: control paradigms and data structures. Vol. 1611. Spie, 1992.
15. Zhao, Mengliu, et al. "Skin3D: Detection and longitudinal tracking of pigmented skin lesions in 3D total-body textured meshes." Medical Image Analysis 77 (2022): 102329.
16. Ahmedt-Aristizabal, David, et al. "Monitoring of pigmented skin lesions using 3D whole body imaging." Computer Methods and Programs in Biomedicine 232 (2023): 107451.
17. Huang, Wei-Lun, et al. "Skin lesion correspondence localization in total body photography." International Conference on Medical Image Computing and Computer-Assisted Intervention. Cham: Springer Nature Switzerland, 2023.
18. Prada, Fabián, et al. "Motion graphs for unstructured textured meshes." ACM Transactions on Graphics (TOG) 35.4 (2016): 1-14.
19. Munkres, James. "Algorithms for the assignment and transportation problems." Journal of the society for industrial and applied mathematics 5.1 (1957): 32-38.
20. Wang, Runzhong, et al. "pygmtools: A python graph matching toolkit." Journal of Machine Learning Research 25.33 (2024): 1-7.
21. Alcantarilla, Pablo F., and T. Solutions. "Fast explicit diffusion for accelerated features in nonlinear scale spaces." IEEE Trans. Patt. Anal. Mach. Intell 34.7 (2011): 1281-1298.

The invention claimed is:

1. A method of processing Total Body Photography (TBP) images comprising:
   using a plurality of TBP images capturing different views of the patient's skin;
   processing one or more TBP images to identify a plurality of initial two dimensional lesion candidates within each processed image, wherein the initial two dimensional lesion candidates are identified by applying at least two different types of feature detectors including at least one keypoint detector optimized for larger structures and at least one keypoint detector optimized for smaller features;
   performing single-image deduplication on the initial two dimensional lesion candidates within each processed TBP image using a two-step filtering process comprising a threshold-based filtering and a spatial clustering using density-based spatial clustering of applications with noise;
   validating the initial two dimensional lesion candidates based on at least one feature of target lesions including color characteristics relative to surrounding skin regions or permissible dominant color values in YCrCb color spaces to create a set of validated features;

de-duplicating the initial two dimensional lesion candidates detected in multiple images into a set of unique lesions on the patient's skin; and, storing three dimensional information and the validated features of the set of unique lesions.

2. The method of claim 1, wherein de-duplicating the initial two dimensional lesion candidate lesions consists of back-projecting at least a subset of the initial two dimensional lesion candidates onto a three dimensional mesh representation to determine corresponding three dimensional locations, wherein the three dimensional mesh is generated from the plurality of TBP images, grouping the corresponding three dimensional locations into clusters based on spatial proximity in three dimensions wherein each cluster corresponds to detections of candidate lesions, and selecting a single representative lesion in each cluster.

3. The method of claim 2 wherein selecting a single representative lesion is further limited based on a calculated best-view score associated with detections, wherein the best-view score is calculated based on properties comprising at least an incident view angle of the TBP image relative to a surface normal at the three dimensional location of a candidate lesion, a distance from the three dimensional location of the candidate lesion of the TBP image center to a geometric centroid of its corresponding cluster, and a sharpness value that the candidate lesion appears in its TBP image.

4. The method of claim 2, wherein the processing further includes computation of the three dimensional location of the surface normal, the size, or the barycentric coordinate of the lesion represented in the three dimensional mesh representation of portions or an entirety of the patient's skin surface based on the plurality of TBP images.

5. The method of claim 1, wherein de-duplicating the initial two dimensional lesion candidate lesions consists of forming a view-graph for the plurality of TBP images, matching lesions and keypoints across two or more TBP images based on the view-graph, creating clusters of lesions wherein each cluster corresponds to detections of candidate lesions, and selecting a single representative lesion in each cluster.

6. The method of claim 5 wherein selecting a single representative lesion is further limited based on a calculated best-view score associated with detections, wherein the best-view score is calculated based on properties comprising at least an incident view angle of the TBP image relative to a surface normal at a three dimensional location of a candidate lesion, a distance from the three dimensional location of the candidate lesion to a geometric centroid of its corresponding cluster, and a sharpness value that candidate lesion appears in its TBP image.

7. A method of finding Dynamic Ugly Duckling lesions comprising the steps of:
detecting all unique lesions from images taken from two scans of an individual at two points of time, said two scans producing first and second scans, wherein each of the two scans comprises a plurality of TBP images; and,
establishing lesion correspondences between the lesions from the first scan and those from the second scan as well as all new lesions from the second scan are detected using one of two methods;
a first method comprising the steps of computing two coarse correspondence maps from three dimensional textured meshes of two time points to a template mesh wherein each of the three dimensional textured meshes are generated from the plurality of TBP images at a time point, refining the two coarse correspondence maps from flow field using texture and lesion signals, and performing lesion assignment using Kuhn-Munkres algorithms;
or a second method comprising the steps of computing a landmark-based correspondence map between the scans, finding pairs of source and target views in correspondence, and performing template matching for finding corresponding lesions;
detecting, based on lesion correspondences obtained using said first or said second method, a clinician-specified number of lesions that have changed most based on features of the lesions.

8. The method of claim 7, wherein change is computed using ABCD rule or Weighted 7-Point rule.

9. The method of claim 7, wherein change is detected by an AI that is trained using temporal images of unchanged and changed lesions over time.

10. The method of claim 7, wherein change is detected by a first AI that describes the corresponding lesions from first and second scans at two points in time and a second AI that uses the AI generated descriptions to identify changes that are indicative of malignancy.

11. A method for processing Total Body Photography images including an apparatus for accessing and storing information and executing instructions for processing Total Body Photography (TBP) images captured from a patient's skin comprising the steps of:
using a plurality of TBP images capturing different views of the patient's skin;
processing one or more TBP images to identify a plurality of initial two dimensional lesion candidates within each processed image, wherein the initial two dimensional lesion candidates are identified by applying at least two different types of feature detectors including at least one keypoint detector optimized for larger structures and at least one keypoint detector optimized for smaller features;
performing single-image deduplication on the initial two dimensional lesion candidates within each processed TBP image using a two-step filtering process comprising a threshold-based filtering and a spatial clustering using Density-Based Spatial Clustering of Applications with Noise;
validating the initial two dimensional lesion candidates based on at least one feature of target lesions including color characteristics relative to surrounding skin regions or permissible dominant color values in YCrCb color spaces;
de-duplicating the initial two dimensional lesion candidates detected in multiple images into a set of unique lesions on the patient's skin;
storing the three dimensional information and the validated features of the set of unique lesions.

12. The method of claim 11, wherein de-duplicating the initial two dimensional lesion candidate lesions consists of back-projecting at least a subset of the initial two dimensional lesion candidates onto a three dimensional mesh representation to determine corresponding three dimensional locations wherein the three dimensional mesh is generated from the plurality of TBP images, grouping the three dimensional locations into clusters based on spatial proximity in three dimensional wherein each cluster corresponds to detections of candidate lesions, and selecting a single representative lesion in each cluster.

13. The method of claim 12, wherein selecting a single representative lesion is further limited based on a calculated best-view score associated with detections wherein the best-view score is calculated based on properties comprising at least an incident view angle of the TBP image relative to a surface normal at the three dimensional location of a candidate lesion, a distance from the three dimensional location of the candidate lesion to a geometric centroid of its corresponding cluster, and a sharpness value that the candidate lesion appears in its TBP image.

14. The method of claim 12, wherein the processing further includes computation of the three dimensional location of the surface normal, the size, or the barycentric coordinate of the lesion represented in the three dimensional mesh representation of portions or the entirety of the patient's skin surface based on the plurality of TBP images.

15. The method of claim 11, wherein de-duplicating the initial two dimensional lesion comprises the step of forming a view-graph for the plurality of TBP images, matching lesions and keypoints across two or more TBP images based on the view-graph, creating clusters of lesions wherein each cluster corresponds to detections of candidate lesions, and selecting a single representative lesion in each cluster.

16. The method of claim 15, wherein selecting a single representative lesion is further limited based on a calculated best-view score associated with detections wherein the best-view score is calculated based on properties comprising at least an incident view angle of the TBP image relative to a surface normal at a three dimensional location of a candidate lesion, a distance from the three dimensional location of the candidate lesion to a geometric centroid of its corresponding cluster, and a sharpness value that the candidate lesion appears in its TBP image.

17. The method of claim 11, wherein the processing is further limited to only include Dynamic Ugly Duckling Lesions by detecting all unique lesions from images from two scans of an individual at two points of time, wherein each of the two scans comprises a plurality of TBP images;
  establishing lesions correspondences between lesions from a newer scan and those from an older scan and all new lesions from the newer scan are detected by:
  either computing two coarse correspondence maps from three dimensional textured meshes of two time points to a template mesh wherein each three dimensional textured mesh is generated from a plurality of TBP images at a time point, refining the correspondence maps from flow field using texture and lesion signals, and performing lesion assignment using Kuhn-Munkres algorithms;
  or computing a landmark-based correspondence map between the scans, finding pairs of source and target views in correspondence, and performing template matching for finding corresponding lesions; and,
  detecting a clinician-specified number of lesions that have changed most based on features of the lesions.

18. The method of claim 17, wherein the lesions that have changed most are computed using ABCD rule or Weighted 7-Point rule.

19. The method of claim 17, wherein the lesions that have changed most are detected by an AI that is trained using temporal images of unchanged and changed lesions over time.

20. The method of claim 17, wherein change is detected by a first AI that describes the corresponding lesions from two scans at two points in time to produce descriptions, and a second AI that uses the descriptions of the corresponding lesions to identify the changes that are indicative of malignancy.

21. A system for finding dynamic ugly duckling lesions comprising: one or more processors configured to:
  detect all unique lesions from images taken from two scans of an individual at two points of time, said two scans producing first and second scan data, wherein each of the two scans comprises a plurality of TBP images; and
  establish lesion correspondences between the lesions from the first scan and those from the second scan as well as all new lesions from the second scan which are detected using one of two methods;
  a first method comprising the steps of computing two coarse correspondence maps from three dimensional textured meshes of two time points to a template mesh wherein each of the three dimensional textured meshes are generated from the plurality of TBP images at a time point, refining the two coarse correspondence maps from flow field using texture and lesion signals, and performing lesion assignment using Kuhn Munkres algorithms; or
  a second method comprising the steps of computing a landmark-based correspondence map between the scans, finding pairs of source and target views in correspondence, and performing template matching for finding corresponding lesions;
  detect, based on lesion correspondences obtained using said first or said second method, a clinician-specified number of lesions that have changed most based on features of the lesions.

22. The system of claim 21, wherein change is computed using ABCD rule or weighted 7-point rule.

* * * * *